United States Patent [19]
Corby, Jr.

[11] Patent Number: 4,687,325
[45] Date of Patent: * Aug. 18, 1987

[54] THREE-DIMENSIONAL RANGE CAMERA

[75] Inventor: Nelson R. Corby, Jr., Scotia, N.Y.

[73] Assignee: General Electric Company, Schenectady, N.Y.

[*] Notice: The portion of the term of this patent subsequent to Aug. 18, 2004 has been disclaimed.

[21] Appl. No.: 717,367

[22] Filed: Mar. 28, 1985

[51] Int. Cl.$^4$ .......................... G01C 3/00; G01C 5/00; G01C 11/12
[52] U.S. Cl. ......................................... 356/1; 356/4; 356/2
[58] Field of Search ...................... 356/1, 2, 4, 5, 141, 356/152; 358/98, 108, 125

[56] References Cited
U.S. PATENT DOCUMENTS

| 3,652,159 | 3/1972 | Lietar | 356/4 |
|---|---|---|---|
| 4,168,437 | 9/1979 | Nihonmatsu | 356/1 |
| 4,201,475 | 5/1980 | Bodlaj | 356/4 |
| 4,349,277 | 9/1982 | Mundy et al. | 356/376 |
| 4,443,705 | 4/1984 | DiMatteo et al. | 356/2 |
| 4,443,706 | 4/1984 | DiMatteo et al. | 356/2 |
| 4,491,719 | 1/1985 | Corby, Jr. | 219/124.34 |
| 4,541,723 | 7/1985 | Pirlet | 356/1 |

FOREIGN PATENT DOCUMENTS 2041690  9/1980  United Kingdom ..................... 356/1

OTHER PUBLICATIONS

M. D. Altschuler, et al., "Laser Electro-Optic System for Three-Dimensional (3-D) Topographic Mapping of Surfaces", Optical Engineering, 20,6, Nov./Dec. 1981, pp. 953-961.
S. Inokuchi, et al., "Range-Imaging System for 3-D Object Recognition," IEEE Int'l. Conf. on Pattern Recognition, Aug. 1984, pp. 806-808.

Primary Examiner—Stephen C. Buczinski
Assistant Examiner—Melissa L. Koltak
Attorney, Agent, or Firm—Donald R. Campbell; James C. Davis, Jr.; Paul R. Webb, II

[57] ABSTRACT

A non-contact sensor system measures distance from a reference plane to many remote points on the surface of an object. The set of points at which range is measured lie along a straight line (N points) or are distributed over a rectangular plane (M×N points). The system is comprised of a pattern generator to produce a 1×N array of time/space coded light rays, optionally a means such as a rotating mirror to sweep the coded light rays orthogonally by steps, a linear array camera to image subsets of the light rays incident on the object surface, and a high speed range processor to determine depth by analyzing one-dimensional scan signals. The range camera output is a one-dimensional profile or a two-dimensional area range map, typically for inspection and robotic vision applications.

14 Claims, 15 Drawing Figures

$P = 1 + \log_2 8 = 4$

| | | RAY NO. | | | | | | | |
|---|---|---|---|---|---|---|---|---|---|
| | | 1 | 2 | 3 | 4 | 5 | 6 | 7 | 8 |
| PRESENTATION NO. | 1 | ON | ON | ON | ON | ON | ON | ON | ON |
| | 2 | ON | OFF | ON | OFF | ON | OFF | ON | OFF |
| | 3 | ON | ON | OFF | OFF | ON | ON | OFF | OFF |
| | 4 | ON | ON | ON | ON | OFF | OFF | OFF | OFF |

AT $X_4$ PATTERN IS 011=3;
RAY IS 1+3 = #4
ON=0; OFF=1

THREE-DIMENSIONAL RANGE CAMERA

This invention relates to an optical system to measure range to an object along a line and over a plane, and more particularly to a non-contact sensor or camera system to generate one-dimension profiles and two-dimension range maps.

Range from a reference point or plane to a target point can be measured in many ways. Electromagnetic energy yields RADAR type images, acoustic energy yields SONAR images, and light yields LIDAR images. The range measurement technique in all these approaches uses time-of-flight measurement as a basis for determining range.

In machine vision research and application, an optical effect that has been exploited is structured illumination. In this technique, a ray of light is caused to strike a surface along a direction which is not coaxial with the optical axis of a one or two-dimensional imaging device. The intersection of the ray and surface produces a point of light which is imaged on the sensor plane of the imaging device. The 3-D position of this point in space may be calculated in many ways. If multiple views, using multiple cameras or one moving camera, can be obtained from sensors whose position in space is known, the point's position can be calculated by triangulation from basic trigonometric relations. One sensor may be used if the angle of the light ray is known. Another way that one sensor may be used is if a zero reference plane has been established beforehand. In the latter case, one measures and stores the position in the sensor plane of the image of the 3-D point of light as it strikes the reference plane. Then an unknown surface is introduced and the impinging ray intersects the surface creating a new 3-D point of light whose position is to be measured. The displacement of the image of the new point of light, as measured in the image plane, from the stored or reference position is proportional to the distance of the surface above the reference plane.

In all of these techniques, one measures the position of the point of light in the sensor plane. In an effort to speed up the process, more than one ray of light can be used in a given sensor cycle. Experimenters have used sheets of light producing a line of intersection on the object's surface. This intersection curve when imaged onto a two dimensional sensor plane can be processed to yield a profile under several assumptions about field of view, ray divergences, etc. In addition, one is limited to the frame rate of the sensor—typically 30 frames per second. This works out to one 256×256 frame every 8.53 seconds. In addition, arrays of sheets (producing alternating light and dark bands), two dimensional arrays of light rays (producing grids of points) have been tried. All these methods can suffer from aliasing. Aliasing occurs when the shifted image of a point produced by one ray is confused with that of another ray. In this case the actual range is ambiguous.

The first problem to be solved is how to tag or label individual rays such that when multiple rays are introduced simultaneously into the scene, the intersection points each produces may be unambiguously identified. The second problem is how to construct a device capable of implementing the tagging scheme. The third problem is to develop a range signal processor which is able to rapidly process the image of the tagged shifted points into an array of range values.

Rays of light may be tagged based on static physical properties such as brightness, hue, and phase, or they may be labeled by time modulation of the above characteristics. Static property labelling based on brightness or hue can exhibit aliasing problems, since reflectivity variations on the surface to be sensed can cause a ray with one brightness or hue to be imaged with a brightness or hue corresponding to that of another ray. Phase labelling is a good candidate, but requires a coherent source such as a laser. Such systems are used in transits for surveying. They are complicated and tend to take a long time (2-5 seconds) per point for each measurement.

Time modulation could be employed by using time modulations (simple chopping, for example) at N different frequencies. One would have to process the image of the N points at a rate 2 to 4 times faster than the highest frequency of variation but would have to accumulate data for a time interval 2 to 4 times longer than the period of the lowest frequency. Unless N parallel systems were employed, each tuned to a particular frequency, the time per point could be unacceptably high.

The published technical papers, such as M. D. and B. R. Altschuler and J. Taboada, Optical Engineering, November/December 1981, show that the idea of time/space coding has been employed a number of times by researchers. These authors used a two-dimensional N×N array of laser rays produced by complex optical apparatus such as shear plates and electro-optic shutters. The device assumes "on" and "off" coding of the laser beams. It has been shown that for N rays, it is possible to uniquely identify all rays by processing $P = 1 + \log_2 N$ sequential presentations of rays. A 2-D raster scan camera is utilized to image each of the individual sequential schemes comprising the set of scenes to be analyzed per complete range image. There is the problem of processing this image rapidly (¼ to ⅛ second) so as to find the centroid of all visible dots. This is difficult to do rapidly on a large raster scanned image; it presents a complex 2-D centroid finding problem.

SUMMARY OF THE INVENTION

An object of the invention is to provide an improved non-contact sensor/camera system that is more suitable for industrial vision and measurement tasks and outputs a one-dimensional array of distances for profiling and a matrix of distances for area ranging.

Another object is the provision of such a range camera system having a means of producing time/space coded light rays inexpensively, rapidly, and flexibly, using two or more brightness levels.

Yet another object is the provision of image analysis along a line rather than over an area, and creation of area range arrays by sweeping the line profile in a direction orthogonal to the profile.

The non-contact sensor system to measure range to a three-dimensional object from a reference plane has the following components. A pattern generator and projector produces a 1×N array of time/space coded light rays whose intensities can be varied with time, and projects P sequential presentations of different subsets of the light rays onto the object, where $P = 1 + \log_b N$ and b is the number of brightness levels and N is the number of rays. A linear array sensor such as a line scan camera images the points of light where rays are incident on the object surface, and generates one-dimensional scan signals which have ray peaks at locations corresponding to imaged light. A high speed range processor analyzes the one-dimensional waveforms to uniquely identify all rays, determine depth from the displacement of the ray peaks from zero height reference plane peaks, and provide output range data. To create two-dimensional range maps, a means such as a rotating mirror is provided for othogonally sweeping the 1×N coded light rays by steps over a rectangular plane.

The pattern generator includes a sheet light source and a rotating code wheel similar to an optical encoder disk. It has one or more group patterns each comprised of one pattern per presentation of discrete regions whose light transmission coefficients are selected to spatially modulate the light sheet into coded light rays. In a binary system (b=2) the regions are clear and opaque and the rays are "on" or "off". A lens system projects the coded rays onto the object. A means of delivering a remotely generated pattern of light rays to the sensing site utilizes a reduction lens to project the coded rays onto the entrance of a coherent optical fiber bundle and a lens system to reimage the ray pattern on the object surface.

The pattern generator and projector in another embodiment of a range camera for profiling has a narrow laser beam source, a modulator to vary beam intensity, and a beam deflector to scan the modulated beam along a straight line and project it onto the object surface.

This range camera system is high speed and capable of generating one or more range maps per second. Since image analysis involves processing one-dimensional signals, the system is self calibrating and immune to surface reflectivity variations to a large extent. It is useful in inspection and measurement of three-dimensional surfaces and in robotic vision, for object recognition and position determination.

DETAILED DESCRIPTION OF THE INVENTION

Figure 1:
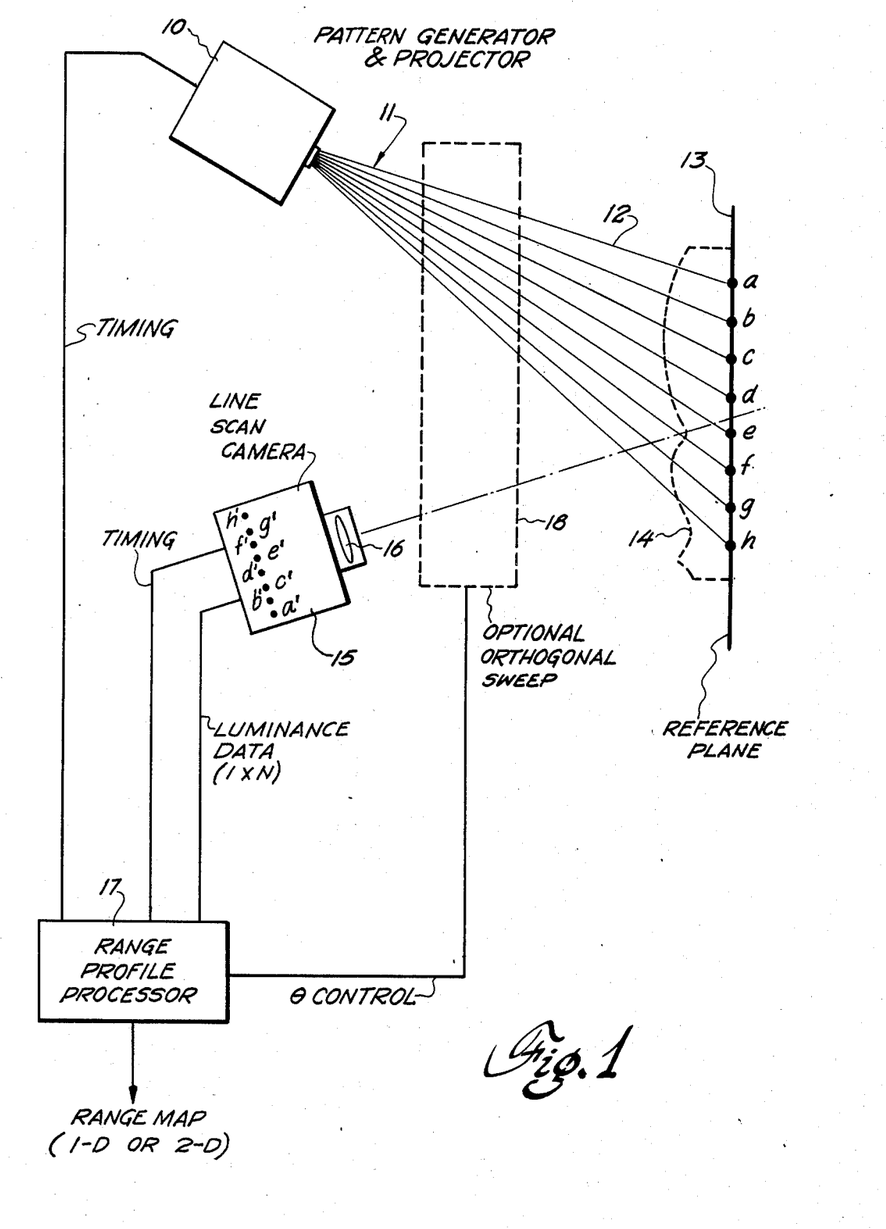
FIG. 1 is a schematic top view of a first embodiment of the range camera system for profiling applications and shows in dashed lines a rotating mirror to implement area ranging.

The components of the preferred embodiment of a three-dimensional range camera system are seen in FIG. 1. A pattern generator and projector 10 generates at high speed and low cost a 1×N array 11 of time and space coded light rays 12 which are illustrated projected onto a reference surface 13. The object 14 to be profiled, shown in dashed lines, is placed on this surface and depth or height is measured from this reference plane (z=0) to the surface of the object. The total number of light rays N is typically large, N=128 or 256, but for purposes of explanation, N=4 and 8 in some of the figures. The dots of light where the projected rays 12 strike reference surface 13 (assuming the object is not there) are indicated as points a-h. A linear array sensor such as line scan camera 15 is oriented in the plane of the rays and views the points of light at an angle to the projected rays 12. A lens 16 on the camera focuses the imaged points a'-h' on the light sensitive elements. The line scan camera may be a Reticon Corp. 1×2048 pixel camera which can scan at rates up to 2000 scans per second. Care must be taken to use a high resolution lens with sufficient depth of field.

Linear scan signals sequentially read out of line scan camera 15 are sent to a range profile processor 17, which has a special purpose range calculation computer. Its output is a 1×N array of distances for a profiling application, i.e., the height or depth of the object at points on its surface relative to the reference plane, above reference points a-h. The system optionally has an orthogonal sweep means 18, such as a rotating mirror, to orthogonally sweep the coded light rays 12 over a rectangular plane. Area range maps are produced by optically or mechanically stepping the profiler field of view in a direction orthogonal to the profile direction. Range processor 17 receives 1×N arrays of luminance data read out of line scan camera 15, coordinates timing of the camera 15 and pattern generator 10, and has a θ control to step the rotating mirror 18.

Figure 2:
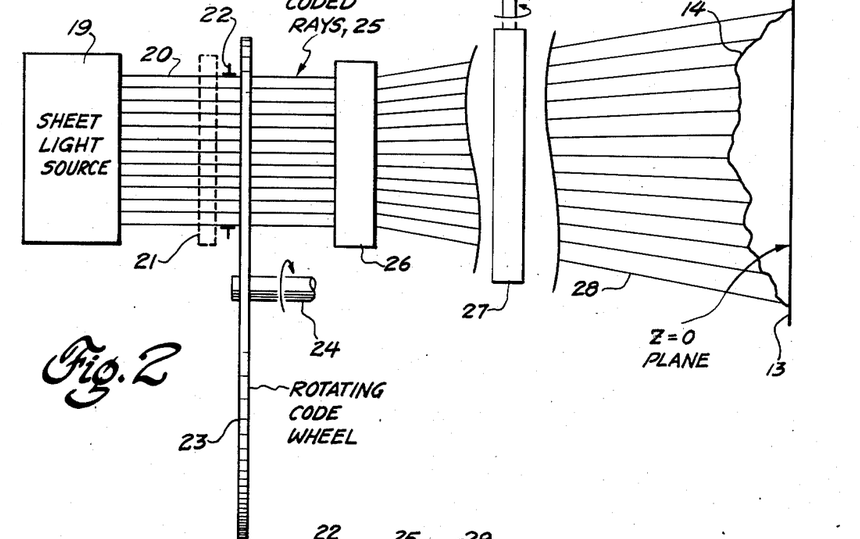
FIG. 2 shows in greater detail a top view of the pattern generator and projector and the orthogonal sweep mirror.

The function of pattern generator 10 is to produce a one dimensional array of rays of light each of whose intensities (and/or hues, if desired) can be varied with time. These rays strike the surface to be profiled and are imaged by the line scan camera 15. Referring to FIG. 2, a light source 19 emits a collimated sheet of light 20. This can be an incandescent point or line source, a laser, or other appropriate light source. The dimensions of a pattern generator using a laser source that was built and operated are given, but the invention is not limited to these details. Collimated light sheet 20 is focussed, if necessary, by a cylindrical lens 21 into a thin line on the order of 0.010-0.020 inches thick. A field stop 22 in the form of a rectangular aperture mask approximately 1 inch by 0.008 inches is placed at the focus of lens 21. This will create a rectangular light source of high intensity. The light sheet apertured by the mask impinges on the face of a rotating code wheel 23 which is mounted on a shaft 24 and turned by steps. The rotating code wheel 23 is similar to an optical encoder disk, in this case a glass disk upon whose surface has been photodeposited a pattern of sectors. Each of the sectors has a pattern comprised of clear and opaque regions to spatially modulate the light sheet 20 into time/space coded light rays 25. The 1×N sheet of coded rays 25 are projected by a projection lens system 26 onto an angularly positionable mirror 27. The mirror is omitted to profile along a single line. From the mirror surface, the N rays are projected through space and strike the surface of the object 14 to be scanned. An area of N by M samples can be scanned by stepping the mirror 27 through M small angular steps. FIG. 2 is a top view of the range camera system; the light sheet 20 is horizontal, rotating code wheel 23 is vertical, and the axis of rotating mirror 27 is horizontal. In an industrial setup, the projected rays 28 are bent through 90°, more or less, onto the object which is placed on a horizontal reference surface 13. The object is stationary as it is scanned. An alternative, used in laboratory experiments, is that the entire range camera system is stationary and the object 14 is mounted on a vertically moving robot arm.

Figure 3:
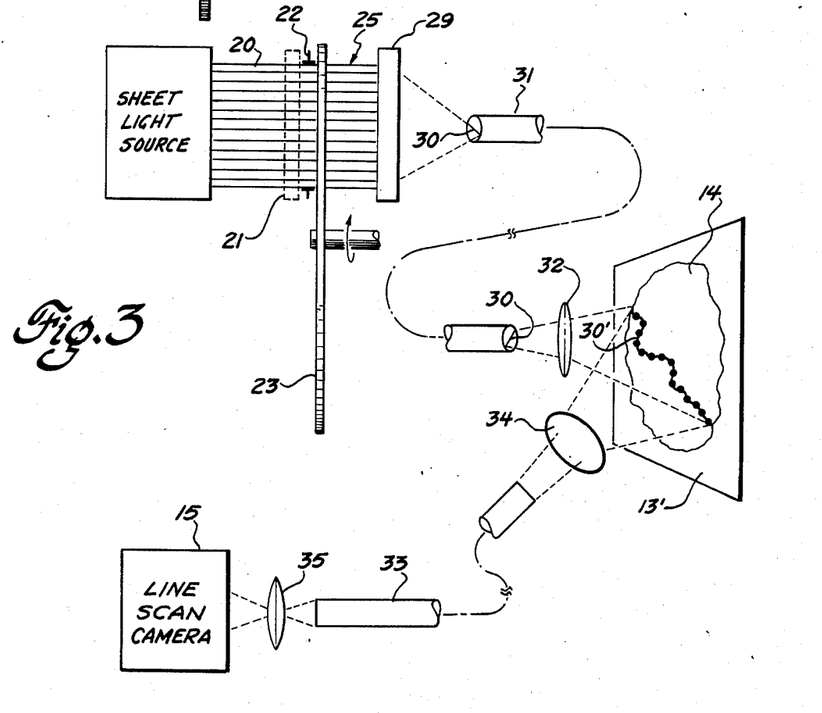
FIG. 3 shows an alternative to the projection scheme in FIG. 2 and has a coherent fiber optic bundle for remote projection of the coded rays.
Figure 4:
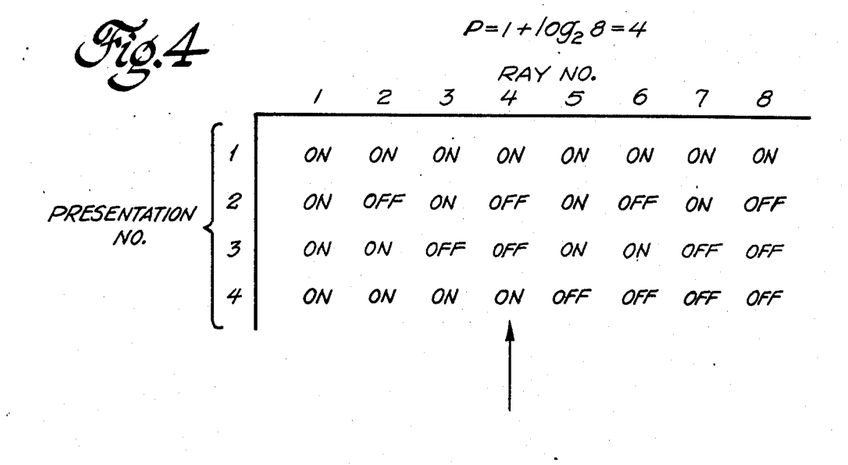
FIG. 4 has a table of ray states at four sequential presentations to explain the principle of time/space coding, letting the number of light rays N=8.
Figure 5A:
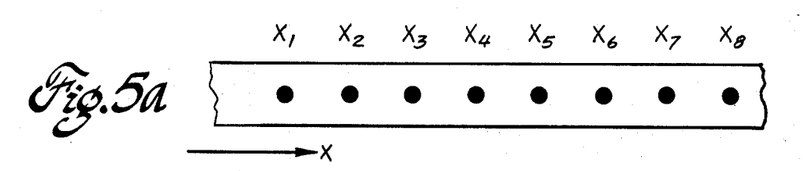
FIGS. 5a-5d illustrate the pattern of light rays incident on the object at the four presentations.
Figure 5B:
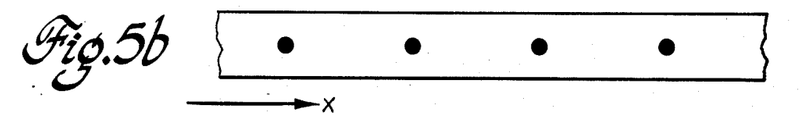
Figure 5C:
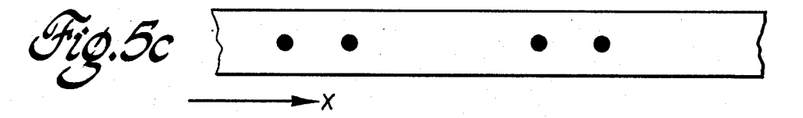
Figure 5D:
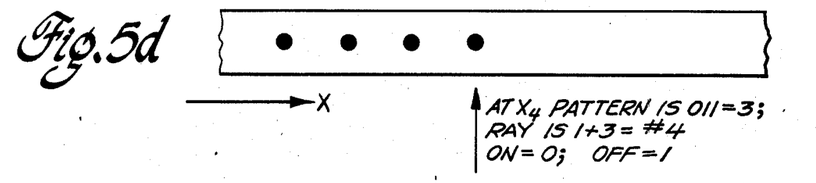

A unique means of projecting the time/space coded light ray pattern employs a coherent fiber bundle as shown in FIG. 3. A reduction lens 29 in this case projects the demagnified image 30 of the 1×N ray array onto the entrance surface of a coherent optical fiber bundle 31. At the exit end the pattern is reproduced exactly, and is then projected with a lens system 32 onto the surface in question where it is imaged by the line array sensor. The projected light pattern 30' is illustrated incident on the surface of a 3-D object 14. A coherent optical fiber bundle 33 can also be used to convey the image of the surface to be profiled or area mapped to the line array camera. The embodiment in FIG. 3 allows the exit end of coherent fiber bundle 31 and projection lens 32 to be on the robot arm with the image pickup coherent bundle 33 and imaging lens 34; the remainder of the range camera system including line scan camera 15 and lens 35 at the exit end of bundle 33 are remotely located.

The principle of time/space coding of light rays is now explained. This invention uses the idea of presenting N rays simultaneously in each of P presentations. If there are more than two brightness levels, it can be shown that for N rays, it is possible to uniquely identify all rays by processing $P = 1 + \log_b N$ sequential presentations of rays. In a binary system, $b = 2$, and the number of presentations $P = 1 + \log_2 N$. In each presentation for the binary case, different subsets of the N rays are "on" with the balance of the rays "off".

FIGS. 4 and 5a–5d illustrate the principle for $N = 8$. In this case, $P = 1 + \log_2 8 = 4$. There are four sequential presentations of the coded light rays, all at the same location of the object to be profiled. In the first presentation, all eight rays are "on". In the second presentation, the rays are alternately "on" and "off". In the third, pairs of rays are alternately "on" and "off", and in the fourth, the first four rays are "on" and the second four rays are "off". These four presentations are depicted in FIGS. 5a–5d; the incident light rays appear as dots of light on the object surface. All four figures show the identical object surface, but at different points of time. Having received the four images, the light rays are uniquely identified as follows. If "on" $=0$ and "off" $=1$, at $x=x_4$, the pattern in binary notation (reading from bottom to top, patterns 5d, 5c and 5b) is $011 = 3$. The ray is then $1+3=$ no. 4. At $x=x_6$, the pattern is $101 = 5$. The ray is $1+5=$ no. 6. The above uses a straight binary coding of rays. Other coding, such as a Gray coding, may be more useful.

Figure 6:
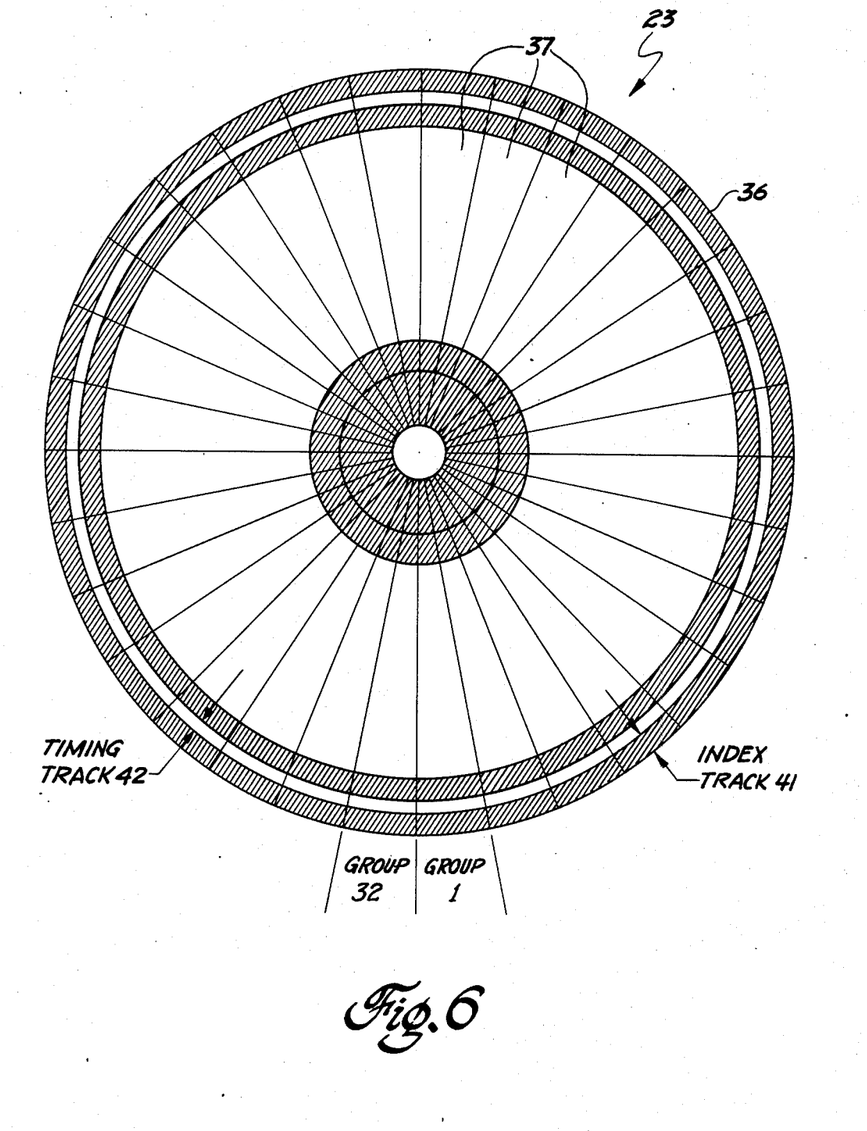
FIGS. 6-8 depict the rotating code wheel, one of the 32 sectors at an enlarged scale, and a typical group pattern in the sector where N=128.
Figure 7:
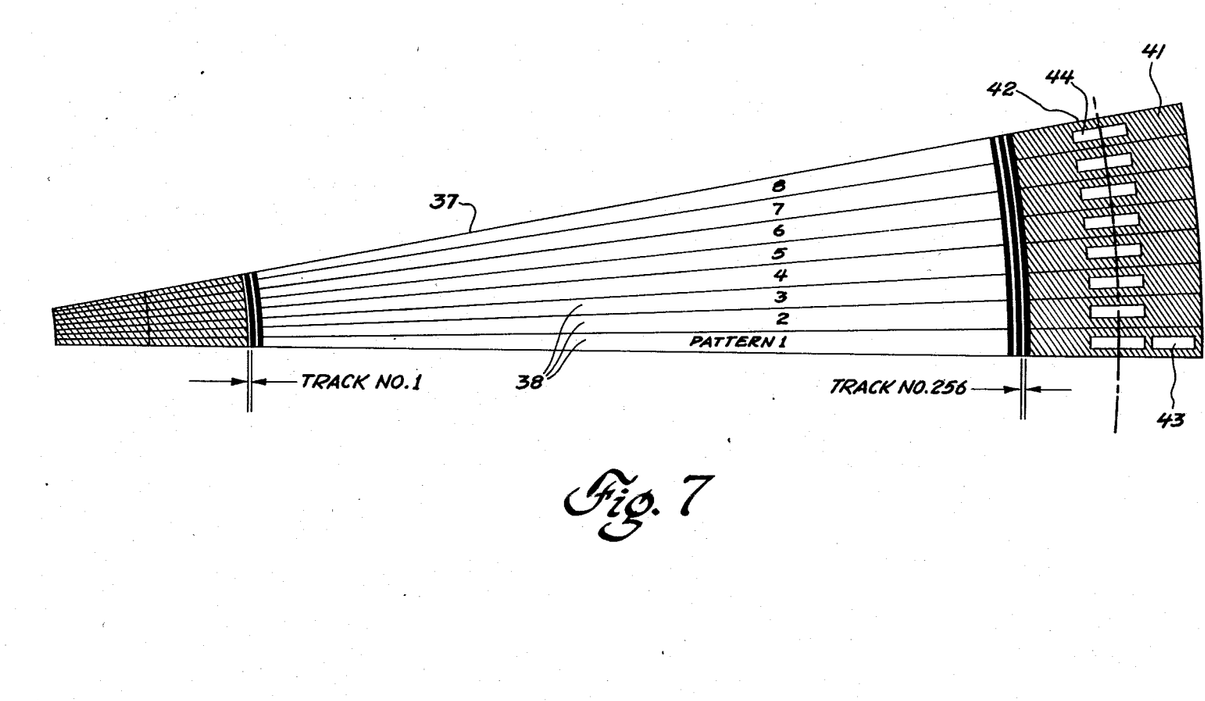
Figure 8:
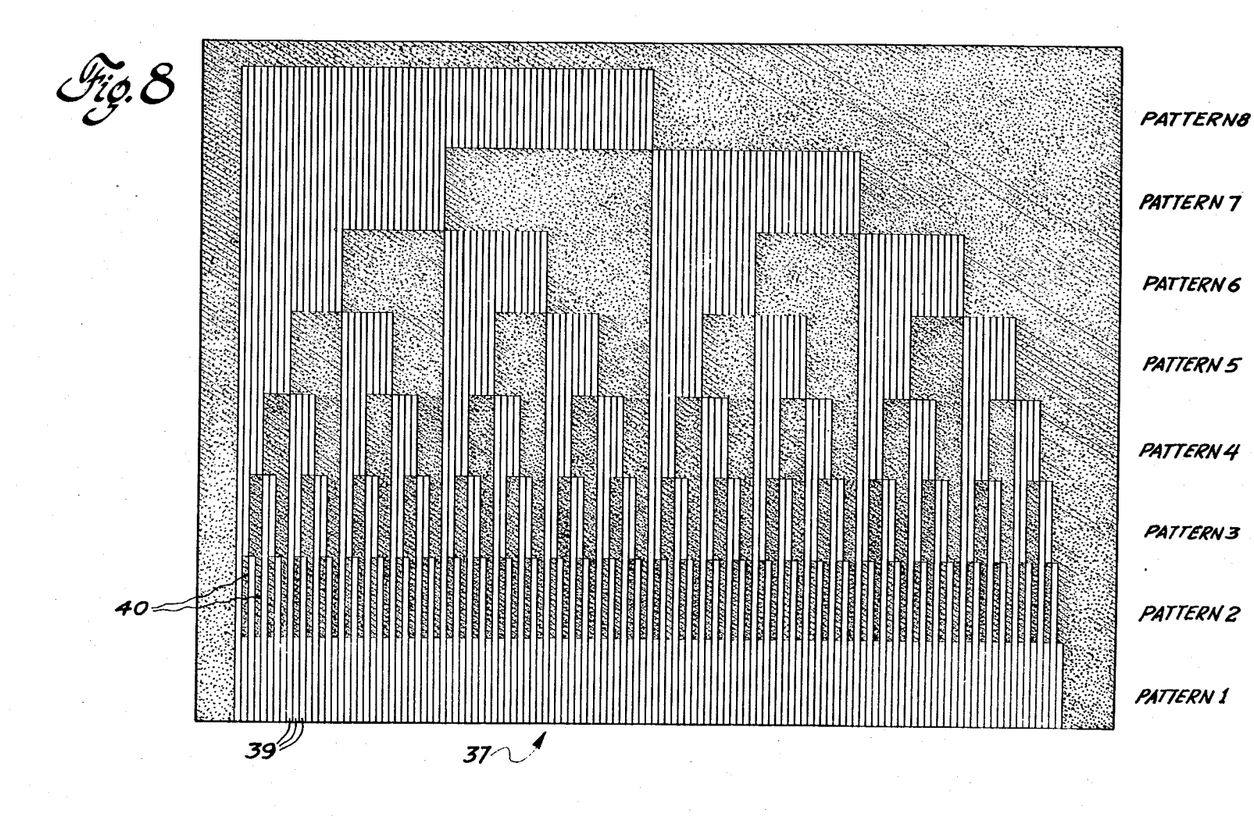

The rotating code wheel 23 and its construction are illustrated in FIGS. 6–8. Here the number of light rays $N = 128$. The rotating code wheel 23 for such a 128 point profiler comprises a glass disk 36 onto whose surface has been photodeposited a pattern of sectors. This disk has 32 groups of 8 patterns for a total of 256 sectors. The 32 sector-shaped group patterns 37 are seen in FIG. 6. FIG. 7 shows that every group pattern 37 has 8 sector-shaped patterns 38, one pattern 38 for each of the eight presentations of the light rays. The sector pattern types (see FIG. 8) that are presented as the disk revolves are 1, 2, 3, 4, 5, 6, 7, 8, 1, 2, 3, 4 . . . .

Each sector has 256 circular tracks, of which 128 are opaque (guard tracks) and 128 are information tracks. For the case of two light levels (on and off) the information track is either clear or opaque. By using partially transmitting coatings on a given track, more than two levels of intensity coding can be provided. That is, the light transmission coefficients are selected to take any value between 0 and 1. This disk can be produced by the same technology as is used to make rotating optical encoder disks. Also dielectric films and coatings can be deposited on desired sections of the disk allowing for hue and phase modulation as well as intensity modulation.

A typical group pattern 37 is drawn enlarged in FIG. 8; this figure doesn't show the 128 guard tracks, only the information tracks. The group pattern is composed of 8 sub-patterned sectors. There is one sub-pattern per presentation having clear and opaque regions, indicated at 39 and 40, to divide the continuous light sheet into coded light rays. Pattern 1 has 128 of the clear regions 39, on alternate tracks, and results in the full complement of 128 light rays. Pattern 2 has alternating clear and opaque regions to pass and block light rays. Patterns 3–8 respectively have 2, 4, 8, 16, 32, and 64 rays "on" followed by a like number "off". The sector/track pattern on rotating code wheel 23 acts as 128 parallel "shutters" that spatially modulate the collimated light sheet into 128 coded rays. Two additional tracks 41 and 42 around the periphery of the disk (FIGS. 6 and 7) identify the current pattern being illuminated as well as provide synchronizing information to the scan electronics. Index track 41 has a clear region 43 at the pattern 1 position of each group, and timing track 42 has eight clear regions 44, one for each of the pattern 1–8 positions in each group. The disk 36 just described has 256 tracks and is 4 inches in diameter. Current plans provide for production of a disk 36 with 512 tracks, 256 guard and 256 information bearing, for a 256 point profiler. It is contemplated that the disk can be made smaller, with a 1 inch diameter, if necessary.

Figure 9:
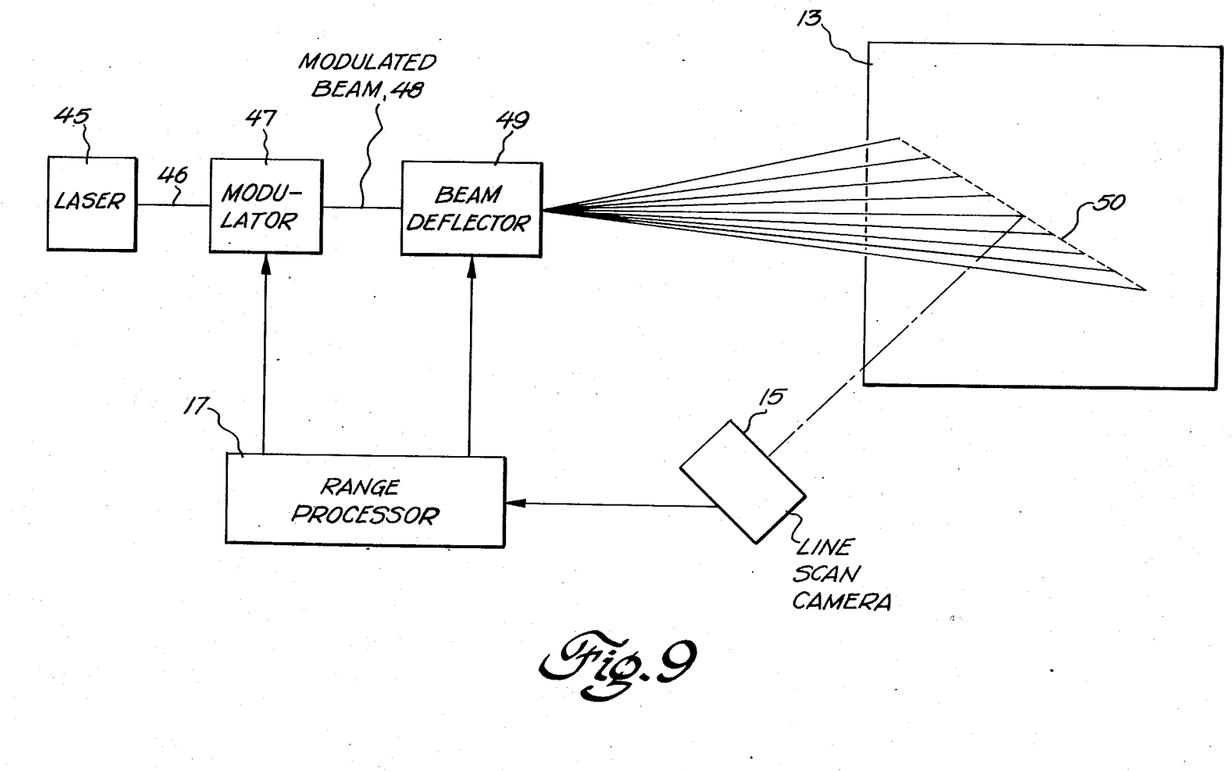
FIG. 9 illustrates an alternative pattern generator and projector and another method to produce coded light rays.

An alternate method to produce the coded rays, replacing the light sheet source, rotating code wheel, and projection lens, is shown in FIG. 9. Here a laser source 45 emits a narrow collimated beam 46 whose intensity is varied by an acousto-optic or electro-optic modulator 47. The modulated beam 48 then is scanned, for instance by a rotating polygonal mirror, galvanometer driven mirrors, or acousto-optic beam deflector 49. The beam deflection is one-dimensional. The scanned modulated beam 50 is illustrated incident on the reference surface 13. The narrow laser beam is modulated into an on-off pattern or may have several brightness levels as previously discussed. The modulation pattern is supplied by the range profile processor 17; this table can be precalculated or stored in a ROM (read-only memory). The range profile processor also controls beam deflector 49, and the 1×N array of luminance data is fed to it by the line scan camera 15 as before. The patterns produced are processed in a similar way to the code wheel produced patterns. This embodiment does not have a separate projection lens because the low divergence of the scanned laser beam makes this unnecessary. The angular width or extent of the pattern is governed by the beam deflector drive. The resulting pattern projection exhibits near infinite depth of focus of the pattern.

Figure 10:
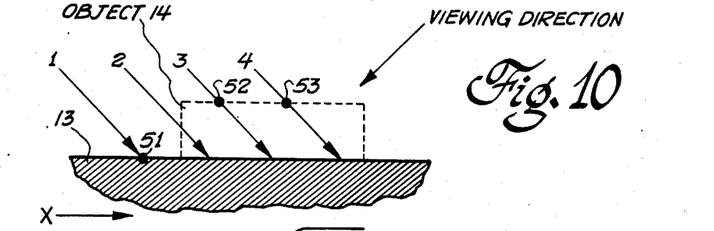
FIG. 10 is a sketch of light rays incident on a reference surface and on an object, to facilitate understanding of the next figures.

The range processor 17 and processing algorithms are now discussed in detail. To review how the light rays are uniquely identified and how the depth calculations are made, FIG. 10 shows a simple object 14 on the reference surface 13, four light rays incident on the reference plane, and the visible points 51, 52 and 53 where rays 1, 3 and 4 strike the object surface. Two sets of linear scan signals outputted by line scan camera 15 are illustrated, the full line reference plane set and the dashed line set with the object in place. These are idealized one-dimensional waveforms, and have one or more ray peaks 54 at X axis locations corresponding to imaged points of light. Here N=4 and there are three sequential presentations of the time/space coded light rays. Line a is the received waveform with rays 1–4 "on", line b with rays 1 and 3 "on", and line c with rays 1 and 2 "on". The ray peaks in all three presentations remain in the same place. Let "on" =0, "off" =1. At $X=X_1$, reading from bottom to top, the ray no. is $1+00=1$; at $X=X_2$, the ray no.$=1+01=2$; at $X=X_3$, the ray no.$=1+10=3$; at $X=X_4$, the ray no. is $1+11=4$. Thus, all the reference plane light rays are determined unambiguously. When profiling the object 14, as seen from the viewing direction, ray 1 hits reference surface 13 at point 51, ray 2 is not visible, and rays 3 and 4 strike the object at points 52 and 53. The last two rays are shifted to the left by an amount proportional to the object height relative to the reference points where those rays are incident on the reference surface 13.

Referring to lines d–f, the ray peaks 54 are at the same X axis locations in all three waveforms. The ray numbers are determined as follows. At $X=X_1'$, the ray no.$=1+00=1$; at $X=X_3'$, it is $1+10=3$; at $X=X_4'$, it is $1+11=4$. There is no ray no. 2. Depth or height calculation at the ith point involves determining the displacement (measured along the X axis) of the ith peak from a calibration, zero height reference plane peak. The shift of ray $1=X_1-X_1'=0$; ray 2 is unknown; ray $3=X_3-X_3'=\Delta X_3$; ray $4=X_4-X_4'=\Delta X_4$.

Figure 11:
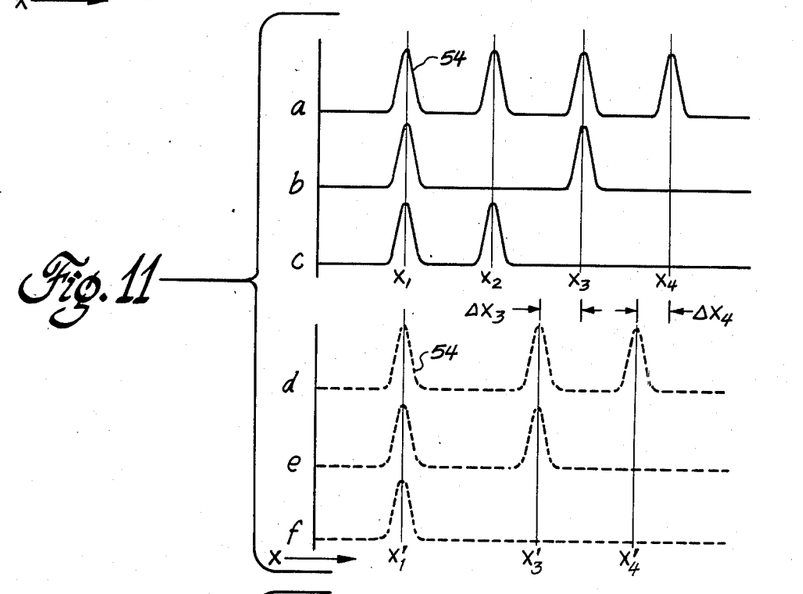
FIG. 11 shows idealized output voltage waveforms of the line scan camera, lines a-c for three presentations of time/space coded rays on the reference surface and lines d-f for presentations of the coded rays on the object surface.
Figure 12:
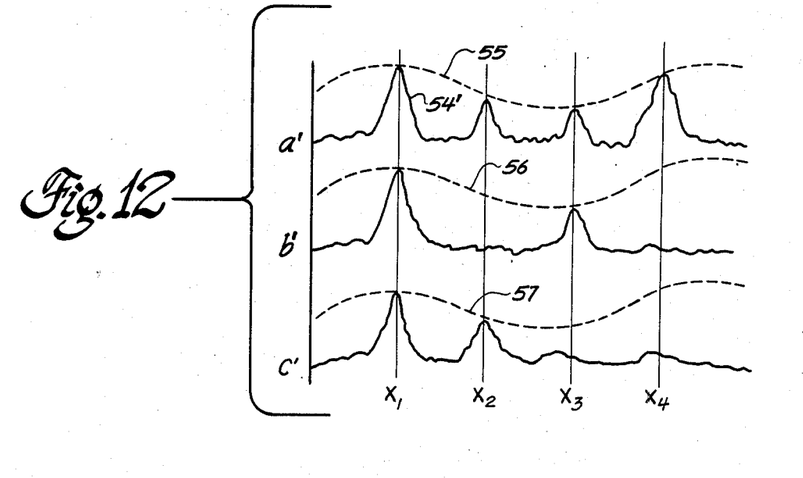
FIG. 12 shows actual camera scan signals and modulation of the "envelope" due to surface reflectivity variations.

If the optical and electronic systems of the pattern projector 10 and the line scan camera 15 were perfect and the surface being scanned had constant reflectance, the line scan camera output would look like FIG. 11. Due to array noise and offsets, reflectance variations, and optical limitations and abberations, the actual scan signal is closer to FIG. 12 (lines a'–c' correspond to lines a–c in FIG. 11). The ray peaks are designated by 54'. Envelopes 55, 56, and 57 are identical and represent variations in the reflectance, etc., which modulate the impressed pattern of rays as a function of position across the part surface. Since the scan signals read out of the line scan camera are one-dimensional waveforms, many of the known signal processing techniques such as matched filtering and correlation detection for analyzing these waveforms may be employed by the range processor 17.

The actual system operation goes as detailed below. The following assumes that first order correction and linearization of the line scan camera have been provided for.

1. Project patterns onto zero reference surface 13.
2. Find location of peaks 54 (N peaks).
3. Store peak positions in reference table (T0); place object below profiler.
4. Project pattern 1 (all dots on).
5. Run peak detector along pattern—note location and strength of each peak in table (T1); there will be L peaks, $L \leq N$.
6. Project pattern 2 (dot 1 on, dot 2 off, etc.).
7. Run peak detector along pattern—note location and strength of each potential peak 54 in table (T2).
8. Do remaining patterns and fill tables T3 thru Tp.
9. Correlate pattern 2 against pattern 1 using any of a number of statistical tests. NOTE: The outcome of the test at each tentative peak location is a "yes" or "no" as to the presence of a peak 54 at a given location in a subpattern. Each of the subpatterns 2–p will exhibit the same response envelope as pattern 1. The only difference is as rays are gated on or off, the corresponding peaks will appear and disappear. Pattern 1 was the only one with all possible visible rays enabled. Now label each of the L entries in table T1 with its identity or ray number.
10. After identification and location of L peaks (L less than or equal to N) from examination of patterns 1 through P, compute the distance (difference) between corresponding entries of table T0 and table T1. There will be L depth values. Due to the shifts of the ray peaks 54 induced by the surface being measured, some of the N rays will not be visible (missing) while in general the spacing will be a function of the surface height gradient.

For a profiling application, the range processor 17 analyzes a single set of camera linear scan signals, one signal per presentation. In an area range mapping situation, each of the M profiles produces a set of P one-dimensional scan signals. The range processor analyzes the M sets of scan signals set by set. It is recognized that some things have to be done only once, such as generating and analyzing calibration, reference plane scan signals. Since the ray peaks are aligned in any given set (such as lines d–f in FIG. 11) the X axis displacement of ray peaks relative to the calibration, reference plane peaks has to be done only once, say for the signal on line d.

The non-contact sensing system has the benefit of being largely invarient to ambient conditions, since all P scans take place at the same physical location, at nearly the same time. Any variation in ambient illumination, etc., is adapted to and compensated for every P scans. For the system that was built and previously referred to, the rotating code wheel 23 presents 1000 patterns per second. Since there are 8 patterns per profile, this corresponds to 125 profiles per second. Thus, changes in the environment occurring slower than 1/125th of a second are compensated for. Changes in surface reflectivity, etc., are compensated for by virtue of testing the current pattern against the base pattern of the current group at a given location. In addition, the range processing computer can interpolate certain types of missing data and can resolve local ambiguities in range. This can be done both on the 1-D profile and the 2-D area range map. It can also map from spherical and cylindrical range data to rectangular or Cartesian range data.

In conclusion, the non-contact sensor/camera system measures distance from a reference point to each of many remote target points. A set of points at which the range is to be measured may lie along a straight line (N points) or may be distributed over a rectangular plane (M×N points). Two ways to generate the time/space coded light rays have been described, and a means of delivering remotely generated coded rays to the sensing site. The system output is a 1×N array of distances for a profiling application, and is a M×N array of distances for an area ranging application. The 1×N profiles are computed at a high rate of, say, 1000-3000 per second, so that a square 128×128 point range image or 256×256 point range image is produced at a rate of several per second.

While the invention has been particularly shown and described with reference to preferred embodiments thereof, it will be understood by those skilled in the art that the foregoing and other changes in form and details may be made without departing from the spirit and scope of the invention.

What is claimed is:

1. A non-contact sensor system to measure range to an object from a reference plane comprising:
   a pattern generator and projector to produce a 1×N array of time and space coded light rays whose intensities can each be varied with time, and to project P sequential presentations of different light ray patterns onto a three-dimensional object, where $P=1+\log_b N$, $b$ is the number of brightness levels and N is the number of rays;
   a linear array sensor which views, at an angle to projected light rays, points of light where said rays are incident on the surface of said object, and generates one-dimensional scan signals which have ray peaks at locations corresponding to imaged light; and
   a range profile processor to analyze said scan signals to uniquely identify all rays, determine depth from the displacement of said ray peaks from calibration, reference plane peaks, and provide a range map.

2. The system of claim 1 and means for orthogonally sweeping said 1×N array of coded light rays by steps over a rectangular plane, whereby at each step one line of light points on the surface of said object are imaged by said linear array sensor and depth is measured to provide an area range map.

3. The system of claim 2 wherein said orthogonal sweep means is a rotating mirror.

4. The system of claim 1 wherein said pattern generator includes a sheet light source, and a rotating code wheel which has at least one group pattern comprised of one pattern per presentation having discrete regions whose light transmission coefficients are selected to spatially modulate the light sheet into said coded light rays.

5. The system of claim 1 wherein said pattern generator and projector includes a sheet light source, a rotating code wheel which has one or more group patterns each comprised of one pattern per presentation having clear and opaque regions to spatially modulate the light sheet into said coded light rays, and a projection lens.

6. The system of claim 1 wherein said pattern generator and projector includes a sheet light source, a rotating code wheel which has at least one group pattern comprised of one pattern per presentation having discrete regions whose light transmission coefficients are selected to spatially modulate the light sheet into said coded light rays, a reduction lens to project said coded rays onto the entrance of a coherent optical fiber bundle, and a projection lens to reimage said coded rays on the object surface.

7. The system of claim 1 wherein said pattern generator and projector includes a narrow laser beam source, a modulator to programmably vary the intensity of said laser beam, and a beam deflector to scan the modulated beam along a straight line and project it onto the object surface.

8. A three-dimensional range camera comprising:
   a pattern generator and projector to produce a 1×N array of time and space coded light rays which can each be varied with time and to project P sequential presentations of different subsets of said light rays onto a three-dimensional object, where $P=1+\log_2 N$ and N is the number of light rays;
   means for orthogonally sweeping said array of coded light rays by steps over a rectangular plane;
   a linear array, line scan camera to image points of light on the surface of said object where said light rays are incident, and generate after each presentation a one-dimensional scan signal which has ray peaks at locations corresponding to imaged light points, said line scan camera generating a set of said scan signals per step; and
   a range processor to analyze said scan signals, set by set, to uniquely identify all rays, determine depth from the displacement of said ray peaks from calibration, reference plane peaks, and output area range map data.

9. The range camera of claim 8 wherein said pattern generator includes a collimated light sheet source and a rotating code wheel which has group patterns each comprised of one pattern per presentation of discrete regions whose light transmission coefficients are selected to spatially modulate the light sheet into said coded light rays, said patterns being illuminated one at a time in sequence.

10. The range camera of claim 9 wherein said projector is a projection lens and said orthogonal sweep means is a rotating mirror.

11. The range camera of claim 8 wherein said pattern generator includes a sheet light laser source and a rotating code wheel which has sector-shaped group patterns each comprised of one pattern per presentation of clear and opaque regions to spatially modulate the light sheet into said coded light rays, said patterns being illuminated one at a time in sequence.

12. The range camera of claim 11 wherein said projector is comprised of a reduction lens to project said coded light rays onto the entrance of a coherent optical fiber bundle and a projection lens to reimage said coded rays on the object surface.

13. A range camera for profiling applications comprising:
   a narrow laser beam source;
   a modulator to vary the intensity of said laser beam;
   a beam deflector to scan the modulated beam along a straight line and project it onto the surface of an object;
   said modulator and beam deflector producing a 1×N array of time and space coded light rays and P sequential presentations of different subsets of said light rays, where $P=1+\log_b N$, $b$ is the number of brightness levels and N is the number of light rays;
   a linear array, line scan camera to image points of light on the surface of said object where said light rays are incident, and generate a one-dimensional scan signal which has ray peaks at locations corresponding to imaged light; and
   a range processor to analyze said scan signals to uniquely identify all rays, determine depth from the displacement of said ray peaks from calibration, reference plane peaks, and output profile data.

14. The range camera of claim 13 wherein said modulator and beam deflector are controlled by said range processor.

* * * * *